United States Patent

Kojima

(10) Patent No.: US 9,929,674 B2
(45) Date of Patent: Mar. 27, 2018

(54) POWER SUPPLY SYSTEM FOR VEHICLE

(71) Applicant: Toyota Jidosha Kabushiki Kaisha, Toyota-shi, Aichi-ken (JP)

(72) Inventor: Koichi Kojima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 260 days.

(21) Appl. No.: 15/071,744

(22) Filed: Mar. 16, 2016

(65) Prior Publication Data

US 2016/0272070 A1 Sep. 22, 2016

(30) Foreign Application Priority Data

Mar. 17, 2015 (JP) .................. 2015-053160

(51) Int. Cl.
*H02J 7/00* (2006.01)
*H02J 7/14* (2006.01)
*H02M 7/44* (2006.01)
*B60L 11/18* (2006.01)
*B60L 3/00* (2006.01)
*B60L 3/04* (2006.01)
*B60H 1/00* (2006.01)

(52) U.S. Cl.
CPC ............ *H02M 7/44* (2013.01); *B60H 1/00* (2013.01); *B60L 3/0069* (2013.01); *B60L 3/04* (2013.01); *B60L 11/185* (2013.01); *B60L 11/1816* (2013.01); *H02J 7/0031* (2013.01); *B60L 11/1809* (2013.01); *B60L 11/1818* (2013.01)

(58) Field of Classification Search
USPC ....... 320/107, 108, 109, 104, 137, 136, 128, 320/162, 166
See application file for complete search history.

(56) References Cited

U.S. PATENT DOCUMENTS

2013/0297129 A1* 11/2013 Ang ................ B60K 6/445
701/22
2014/0232355 A1* 8/2014 Masuda ............ B60L 3/0069
320/137

(Continued)

FOREIGN PATENT DOCUMENTS

JP 2011-160604 A 8/2011
JP 2012-170286 A 9/2012

(Continued)

*Primary Examiner* — Alexis Pacheco
(74) *Attorney, Agent, or Firm* — Dinsmore & Shohl LLP

(57) ABSTRACT

A power supply system for a vehicle includes a power storage device, a direct current inlet, charging relays, a voltage sensor, and an electronic control unit. After system main relays and the charging relays are turned on to charge the power storage device from a power supply outside the vehicle, the electronic control unit is configured to finish the charging from the power supply outside the vehicle. At this time, in a case where an OFF control is performed on the charging relays and the voltage sensor detects a voltage equal to or more than a determination value, the electronic control unit is configured to set the voltage sensor to a state where no voltage is applied thereto from the power storage device, and to execute a voltage sensor check to check whether or not the voltage sensor detects the voltage equal to or more than the determination value.

4 Claims, 7 Drawing Sheets

(56) References Cited

U.S. PATENT DOCUMENTS

| | | | | |
|---|---|---|---|---|
| 2015/0130414 A1* | 5/2015 | Izumi | ................. | B60L 11/1812 |
| | | | | 320/109 |
| 2015/0183329 A1* | 7/2015 | Nakaya | ................. | H02J 3/383 |
| | | | | 307/9.1 |
| 2016/0185241 A1* | 6/2016 | Kinomura | ................. | B60L 3/00 |
| | | | | 307/10.1 |
| 2016/0272070 A1* | 9/2016 | Kojima | ............... | B60L 11/1816 |
| 2016/0288649 A1* | 10/2016 | Ono | ........................ | B60L 1/006 |

FOREIGN PATENT DOCUMENTS

| JP | 2013-247771 A | 12/2013 |
|---|---|---|
| JP | 5655816 B2 | 1/2015 |
| JP | 2016-101033 A | 5/2016 |
| JP | 2016-119762 A | 6/2016 |

* cited by examiner

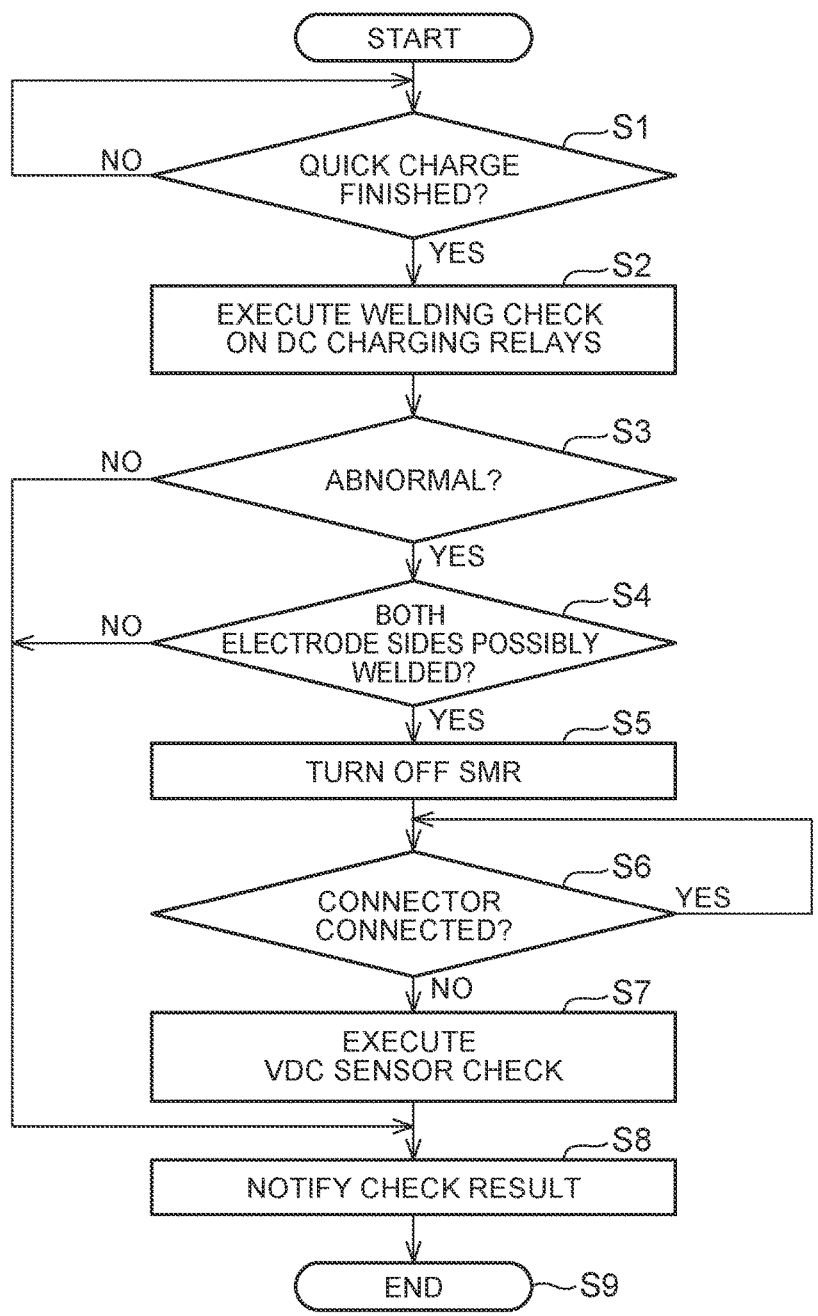

POWER SUPPLY SYSTEM FOR VEHICLE

INCORPORATION BY REFERENCE

The disclosure of Japanese Patent Application No. 2015-053160 filed on Mar. 17, 2015 including the specification, drawings and abstract is incorporated herein by reference in its entirety.

BACKGROUND

1. Technical Field

The present specification relates to a power supply system for a vehicle, more particularly, to a power supply system for a vehicle that can be charged by use of an electric power from an external power supply provided outside the vehicle.

2. Description of Related Art

In recent years, as an environmentally friendly vehicle, a vehicle that is provided with a power storage device (e.g., a secondary battery, a capacitor, and the like) and runs by use of a driving force generated from an electric power stored in the power storage device has attracted attention. Such a vehicle includes an electric vehicle, a hybrid vehicle, a fuel-cell vehicle, and the like, for example. Further, there has been proposed a technique to charge a power storage device to be provided in these vehicles by a commercial power supply with high power generation efficiency.

Japanese Patent Application Publication No. 2011-160604 (JP 2011-160604 A) describes that, in such a vehicle, welding check is performed on a relay provided in a charge path from a vehicle external portion.

In JP 2011-160604 A, in order to perform the welding check on the relay, a voltage sensor is used. However, even in a case where an output value of the voltage sensor indicates an abnormal value, it is also conceivable that the voltage sensor itself is defective. Accordingly, depending on a situation, there is such a possibility that it is unclear whether the abnoiinal value is caused due to a welding defect of the relay or due to a defect of the voltage sensor. Accordingly, in order to determine an operation restriction range at the time of an occurrence of troubles or a replacement part at the time of repair, it is desirable that a defective range be specified in detail.

SUMMARY

The present specification provides a power supply system for a vehicle, which can specify a defective part in detail.

An aspect of the present specification is a power supply system for a vehicle, and the power supply system includes: a power storage device; a power line configured to supply an electric power to a vehicle electric load; a system main relay connected between the power storage device and the power line; a direct current inlet; a charging relay; a voltage sensor; and an electronic control unit configured to control the system main relay and the charging relay. The direct current inlet is configured to receive, from a power supply outside the vehicle, a direct-current power with which the power storage device is charged. The charging relay is connected between the direct current inlet and the power line. The voltage sensor is configured to measure a voltage of a path from the direct current inlet to the charging relay.

The electronic control unit is configured such that, in a case where the electronic control unit turns on the system main relay and the charging relay to charge the power storage device from the power supply outside the vehicle, and after that, the electronic control unit finishes the charging from the power supply outside the vehicle and performs an OFF control on the charging relay, when the voltage sensor detects a voltage equal to or more than a determination value, the electronic control unit sets the voltage sensor to a state where no voltage is applied thereto from the power storage device, and executes a voltage sensor check to check whether or not the voltage sensor detects the voltage equal to or more than the determination value.

With such a control, it is possible to specify whether welding occurs in the charging relay or a defect occurs in the voltage sensor.

Preferably, the electronic control unit may be configured to perform the OFF control on the system main relay so that the voltage sensor is set to the state where no voltage is applied thereto from the power storage device, and then, to check whether or not the voltage sensor detects the voltage equal to or more than the determination value.

As one method for preventing a voltage from being applied to the voltage sensor from the power storage device as such, there is such a method in which the system main relay is disconnected.

Preferably, the electronic control unit may be configured such that, in a case where the electronic control unit turns on the system main relay and the charging relay to charge the power storage device from the power supply outside the vehicle, and after that, the electronic control unit finishes the charging from the power supply outside the vehicle and performs an OFF control on the charging relay, if the voltage sensor does not detect the voltage equal to or more than the determination value, the electronic control unit notifies a check result of the charging relay without executing the voltage sensor check.

With such a control, the check on the voltage sensor is executed only when it is necessary. Accordingly, it is possible to reduce the number of times of the OFF control or the like on the system main relay, thereby making it possible to extend the life of a relay contact.

Preferably, the charging relay may include a positive electrode side relay and a negative electrode side relay, and the electronic control unit may be configured such that, in a case where both of the positive electrode side relay and the negative electrode side relay are controlled to an OFF state and the voltage sensor detects the voltage equal to or more than the determination value, the electronic control unit executes a check on whether or not the voltage sensor is normal.

According to the aspect of the present specification, at the time when a welding check is performed on a relay, it is possible to distinguish welding of the relay from a defect of a voltage sensor.

BRIEF DESCRIPTION OF THE DRAWINGS

Features, advantages, and technical and industrial significance of exemplary embodiments of the present specification will be described below with reference to the accompanying drawings, in which like numerals denote like elements, and wherein:

FIG. 7 is a flow chart to describe a charging-relay defect diagnosis process executed by a control device 30.

DETAILED DESCRIPTION OF EMBODIMENTS

Figure 1:
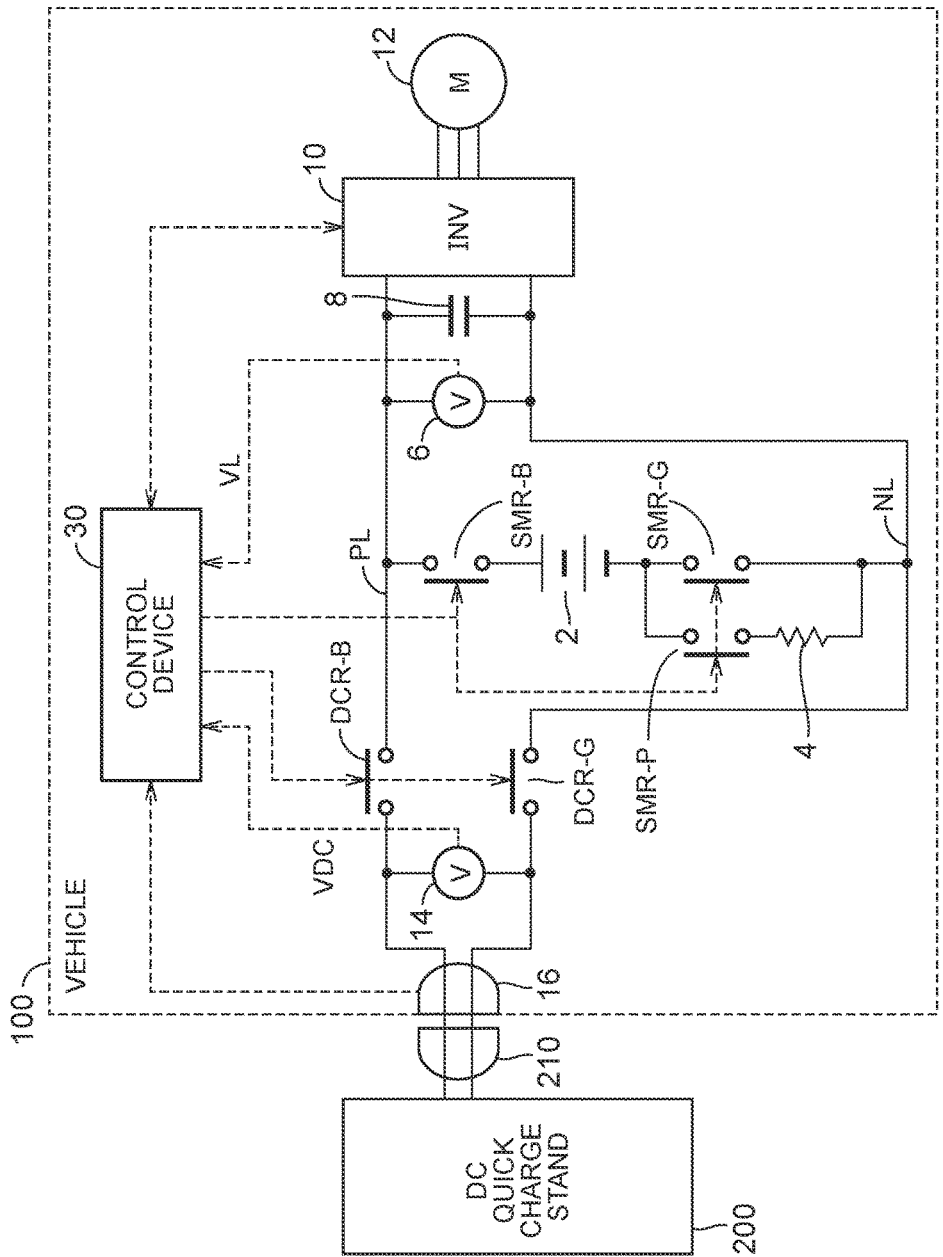
FIG. 1 is an overall block diagram of a vehicle 100 according to the present embodiment.

The following describes an embodiment of the present specification in detail with reference to the attached drawings. Note that the same or equivalent portions in the drawings have the same sign and descriptions thereof are not repeated.

FIG. 1 is an overall block diagram of a vehicle 100 according to the present embodiment. Referring now to FIG. 1, the vehicle 100 is configured such that a power storage device 2 is chargeable via a DC inlet 16 from a DC quick charge stand 200 provided outside the vehicle. More specifically, the vehicle 100 includes the power storage device 2, voltage sensors 6, 14, and system main relays SMR-B, SMR-P, SMR-G, the DC inlet 16, charging relays DCR-B, DCR-C; a capacitor 8, an inverter 10, a motor generator 12, and a control device (corresponding to an electronic control unit) 30.

The power storage device 2 is an electric power storage element that can be charge and discharged. The power storage device 2 includes, for example, a secondary battery such as a lithium-ion battery, a nickel hydrogen battery, or a lead storage battery, and a storage element such as an electric double layer capacitor.

The power storage device 2 is connected to an inverter 10 via the system main relays SMR-B, SMR-P, SMR-G and power lines. The power storage device 2 supplies, to the inverter 10, an electric power to generate a driving force of the vehicle 100. The inverter 10 drives the motor generator 12.

The system main relays SMR-B, SMR-G are inserted between the power storage device 2 and power lines PL, NL for supplying an electric power to the inverter 10. Further, the system main relay SMR-P is connected in parallel with the system main relay SMR-G together with the resistor 4 serially-connected thereto. The system main relays SMR-B, SMR-G, SMR-P are controlled independently by respective control signals from the control device 30, so as to switch supply and cutoff of an electric power between the power storage device 2 and the inverter 10. Note that the resistor 4 functions as a current decreasing resistor that decreases a rush current suddenly flowing to charge the capacitor 8 at the time when the system main relay is closed.

The capacitor 8 is a smoothing capacitor, and is connected between the power line PL and the power line SL. The capacitor 8 decreases a voltage fluctuation between the power line PL and the power line SL.

The voltage sensor 6 detects a voltage VL applied to the capacitor 8, and outputs its detection result to the control device 30.

The motor generator 12 is an alternating-current motor, e.g., a permanent-magnet synchronous motor including a rotor into which permanent magnets are embedded. An output torque of the motor generator 12 is transmitted to drive wheels via a speed reducer or the like, so as to run the vehicle 100. At the time of a regenerative brake operation of the vehicle 100, the motor generator 12 can generate an electric power from a rotational force of the driving wheels. The electric power thus generated is converted by the inverter 10 into a charging electric power for the power storage device 2.

Note that FIG. 1 illustrates an example of an electric vehicle provided with one motor generator 12 for running, but the vehicle 100 may be a hybrid vehicle provided with an engine (not shown) and a motor generator for power generation in addition to the motor generator 12.

The charging relays DCR-B, DCR-G are each inserted between each of the power line PL, NL and each of a positive terminal and a negative terminal of the DC inlet 16. The voltage sensor 14 detects a voltage VDC between the positive terminal and the negative terminal of the DC inlet and transmits it to the control device 30.

In the vehicle having the above configuration, a high direct voltage can be directly input into the DC inlet 16 from the outside of the vehicle, and quick charge can be performed on the power storage device 2. At the time of DC quick charge, a connector 210 as a charger cable for supplying a charging electric power to the vehicle from the DC quick charge stand 200 is connected to the DC inlet 16.

In the quick charge (DC quick charge) for charging by connecting the charger cable to an external power supply, such as the DC quick charge stand 200, that can directly supply a direct current, abnormality (e.g., welding) may occur in the charging relays DCR-B, DCR-G. When abnormality occurs in the charging relays DCR-B, DCR-G, a high voltage of the power storage device 2 might be exposed to an electrode portion of the DC inlet 16. In view of this, it is necessary to periodically perform defect diagnosis on the charging relays DCR-B, DCR-G.

In the vehicle 100 of the present embodiment, in order to perform the welding check on the charging relays DCR-B, DCR-G, the voltage sensor 14 is used. However, even in a case where an output value of the voltage sensor 14 indicates an abnormal value, it is also conceivable that the voltage sensor 14 itself is defective. Accordingly, depending on a defect occurrence situation, there is such a possibility that it is unclear whether the abnormal value is caused due to a welding defect of the charging relays DCR-B, DCR-G or due to a defect of the voltage sensor 14.

In a case where abnormality is detected in the charging relays DCR-B, DCR-G or the voltage sensor 14, such a control is conceivable that charging/discharging of the power storage device is stopped and vehicle running using an electric power of the power storage device is prohibited. However, the vehicle cannot run. On this account, if it can be specified that a defect occurrence part is the voltage sensor 14, evacuation running to a repair shop for repairing the defect can be permitted, which is more convenient for a user. Further, at the time of the repair, if it is specified whether the voltage sensor 14 is defective or the charging relay DCR-B, DCR-G is defective, a repair time is shortened.

With the use of waveform diagrams of FIGS. 2 to 6, the following describes an operation check process of the charging relays DCR-B, DCR-G and the voltage sensor 14, which is performed in the vehicle of the present embodiment. In the present embodiment, at the time when DC quick charge is finished, the charging relays DCR-B, DCR-G are checked.

Figure 2:
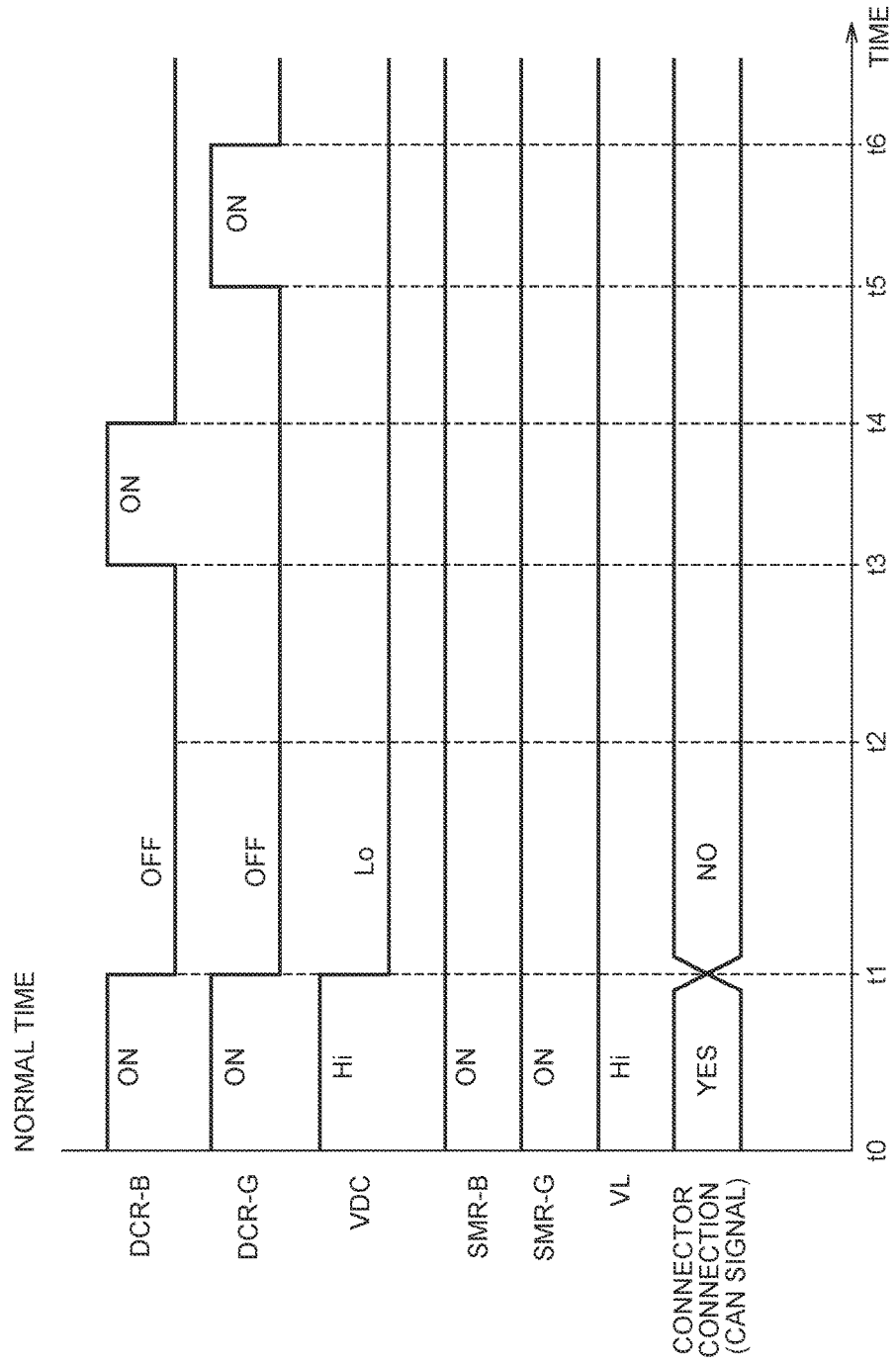
FIG. 2 is a waveform diagram to describe a state at the time when charging relays DCR-B, DCR-G and a voltage sensor 14 are all normal.

FIG. 2 is a waveform diagram to describe a state at the time when the charging relays DCR-B, DCR-G and the voltage sensor 14 are all normal. Referring now to FIGS. 1, 2, at a time t0, the charging relays DCR-B, DCR-G are both controlled to an ON state, and DC quick charge is performed. At this time, the system main relays SMR-B, SMR-G are both controlled to an ON state, so that charging voltages are detected as a voltage VDC of the voltage sensor 14 and a voltage VL of the voltage sensor 6. Note that, in the following description, a state where a voltage is detected by a voltage sensor is indicated by "Hi," and a state where no voltage is detected (a voltage is around 0 V) is indicated by "Lo."

Further, during the quick charge, a communication line is also connected in a connector portion, which is not illustrated in FIG. 1 specifically, so that communications are performed by a CAN (Controller Area Network) signal.

When the DC quick charge is finished at a time t1, the charging relays DCR-B, DCR-G are controlled to an OFF state. When the control is performed normally at this time, no voltage is sent from the DC quick charge stand 200 and a voltage of the power storage device 2 is cut off by turning off the charging relays DCR-B, DCR-G. Accordingly, the voltage VDC detected by the voltage sensor 14 from times t1 to t3 are in a Lo state.

Subsequently, in order to perform a welding check on the charging relay DCR-G, the charging relay DCR-B is controlled to an ON state from times t3 to t4. In response to this, even in a case where the charging relay DCR-B is turned on, if the charging relay DCR-G is not welded, the voltage VDC is not changed from the times t3 to t4, so that the voltage VDC is in a Lo state.

Further, in order to perform a welding check on the charging relay DCR-B, the charging relay DCR-G is controlled to an ON state from times t5 to t6. In response to this, even in a case where the charging relay DCR-G is turned on, if the charging relay DCR-B is not welded, the voltage VDC is not change from the times t5 to t6, so that the voltage VDC is in a Lo state.

When it is confirmed that the voltage VDC is in a Lo state from the times t1 to t6 as described above, the welding check on the charging relays after the DC quick charge is finished so as to wait for a user to detach the connector 210.

At this time, the system main relays SMR-B, SMR-G are not forcibly disconnected. Accordingly, if it is confirmed that the connector 210 is detached from the DC inlet 16, the vehicle can run immediately if necessary.

Figure 3:
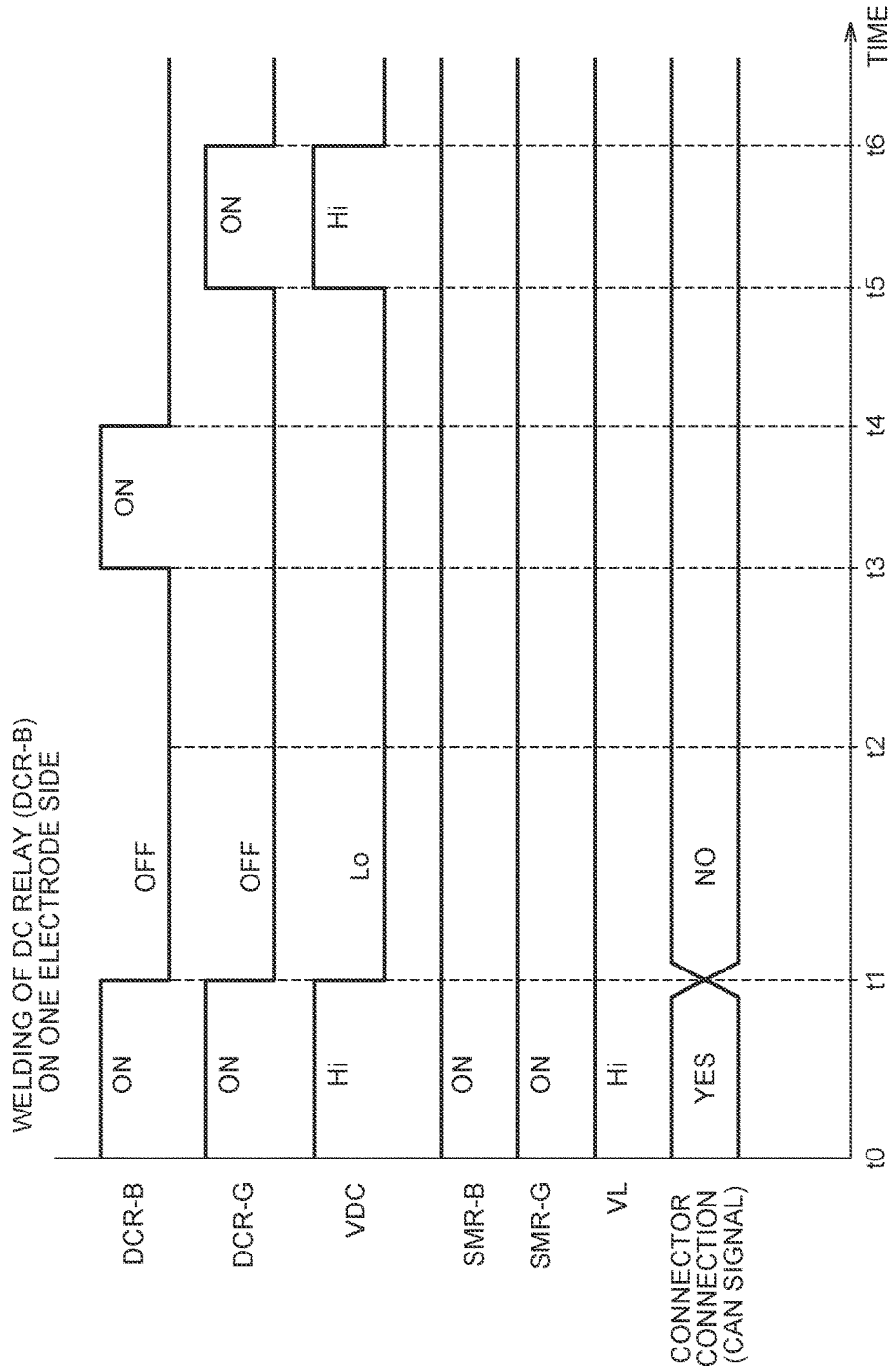
FIG. 3 is a waveform diagram to describe a state at the time when the charging relay (DCR-B) on one electrode side is welded.

FIG. 3 is a waveform diagram to describe a state at the time when the charging relay (DCR-B) on one electrode side is welded. The waveform diagram of FIG. 3 is different from the waveform diagram of FIG. 2 in that the voltage VDC is not in a Lo state, but is changed to a Hi state from the times t5 to t6. The reason is as follows. A welding defect occurs in the charging relay DCR-B, so that the charging relay DCR-B is turned on even when it is controlled to an OFF state. As a result, when the charging relay DCR-G is controlled to an ON state, a voltage of the power storage device 2 is output to the voltage sensor 14. The other part of the waveform of FIG. 3 is the same as FIG. 2, so a description thereof is not repeated.

In a case where such a waveform is observed, the control device 30 determines that a welding defect occurs in the charging relay DCR-B based on such a situation that the voltage VDC is in a Lo state from the times t3 to t4 and the voltage VDC is in a Hi state from the times t5 to t6.

Figure 4:
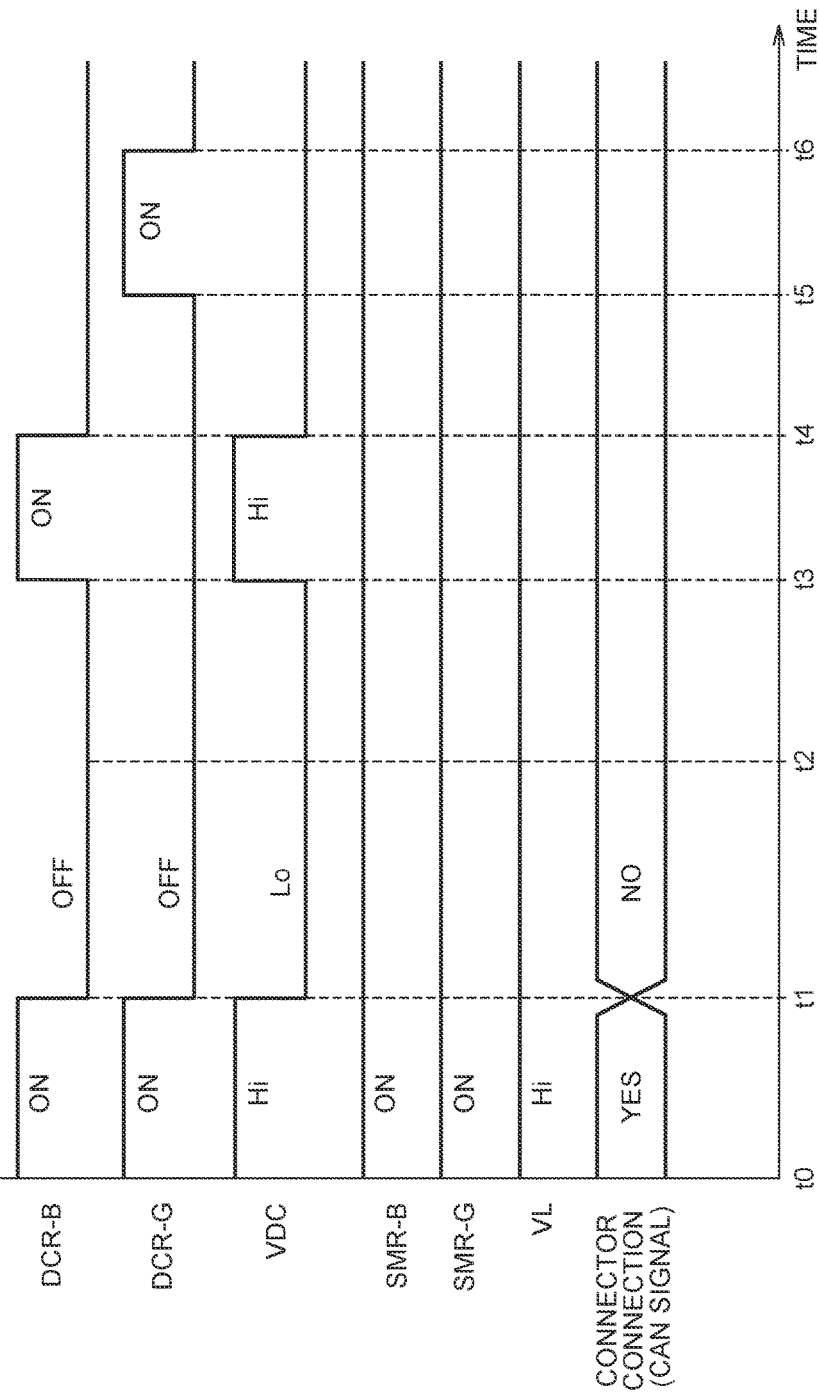
FIG. 4 is a waveform diagram to describe a state at the time when the charging relay (DCR-G) on the other electrode side is welded.

FIG. 4 is a waveform diagram to describe a state at the time when the charging relay (DCR-G) on the other electrode side is welded. The waveform diagram of FIG. 4 is different from the waveform diagram of FIG. 2 in that the voltage VDC is not in a Lo state, but is changed to a Hi state from the times t3 to t4. The reason is as follows. A welding defect occurs in the charging relay DCR-G, so that the charging relay DCR-G is turned on even when it is controlled to an OFF state. As a result, when the charging relay DCR-B is controlled to an ON state, a voltage of the power storage device 2 is output to the voltage sensor 14. The other part of the waveform of FIG. 4 is the same as FIG. 2, so a description thereof is not repeated.

In a case where such a waveform is observed, the control device 30 determines that a welding defect occurs in the charging relay DCR-G based on such a situation that the voltage VDC is in a Hi state from the times t3 to t4 and the voltage VDC is in a Lo state from the times t5 to t6.

Figure 5:
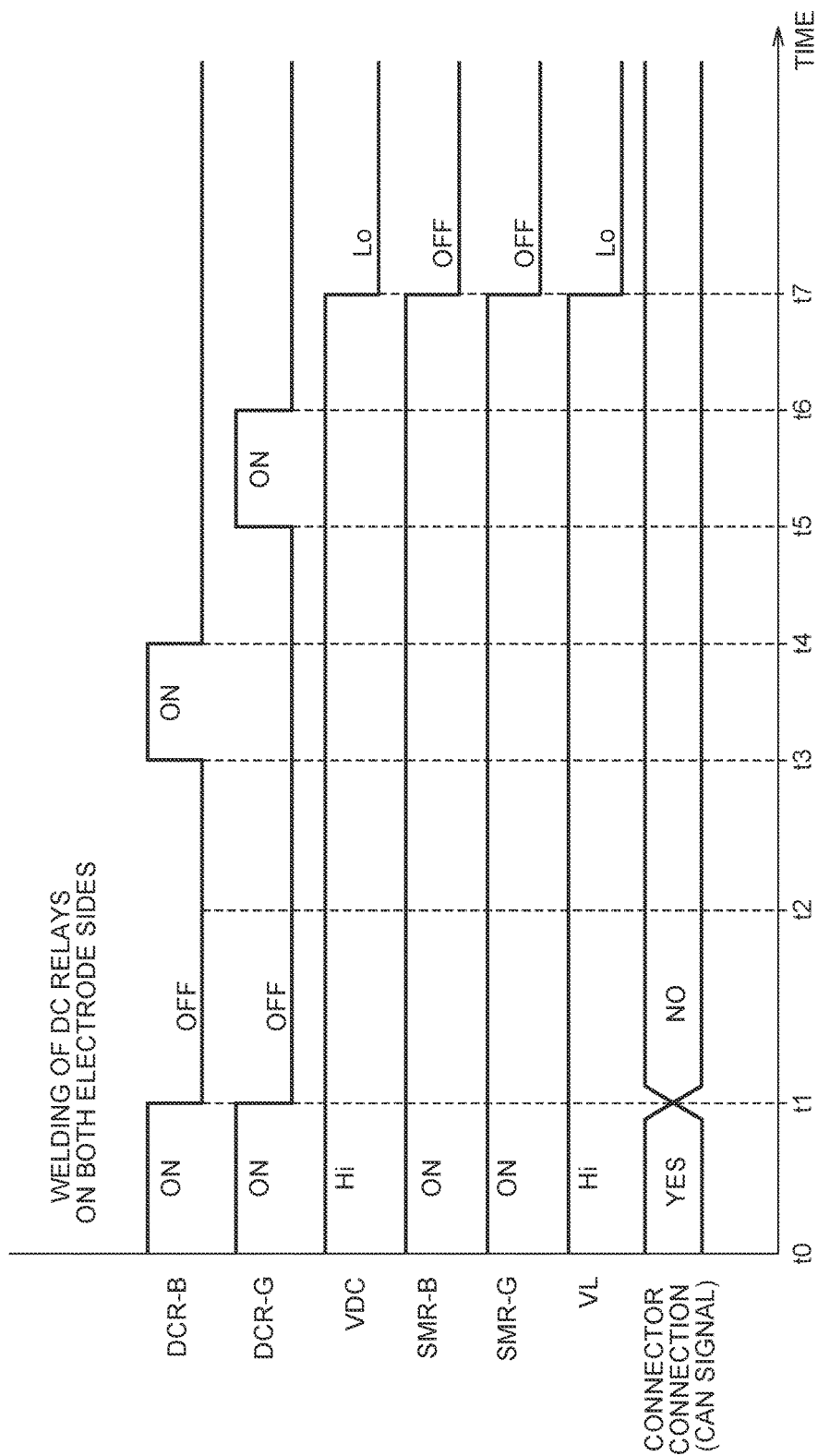
FIG. 5 is a waveform diagram to describe a state at the time when the charging relays (DCR-B, DCR-G) on both electrode sides are welded.

FIG. 5 is a waveform diagram to describe a state at the time when the charging relays (DCR-B, DCR-G) on both electrode sides are welded. The wavefomi diagram of FIG. 5 is different from the waveform diagram of FIG. 2 in that the voltage VDC is not in a Lo state, but is fixed to a Hi state from the times t1 to t7. The reason is as follows. A welding defect occurs in both of the charging relays DCR-B, DCR-G so that the charging relays DCR-B, DCR-G are turned on even when they are controlled to an OFF state. As a result, if the charging relays DCR-B, DCR-G are controlled in any way, a voltage of the power storage device 2 is output to the voltage sensor 14. The other part of the waveform of FIG. 5 from the times t0 to t7 is the same as FIG. 2, so a description thereof is not repeated.

In a case where such a waveform is observed, the control device 30 determines that a welding defect occurs in both of the charging relays DCR-B, DCR-G or the voltage sensor 14 is defective to fix an output to a Hi state, based on such a situation that the voltage VDC is in a Hi state from the times t1 to t3.

In view of this, the control device 30 controls both (or either one) of the system main relays SMR-B, SMR-G to an OFF state so that no voltage is applied to the charging relays DCR-B, DCR-G at the time t7. Consequently, in FIG. 5, the voltage VL detected by the voltage sensor 6 changes from a Hi state to a Lo state, and the voltage VDC detected by the voltage sensor 14 also changes from a Hi state to a Lo state. As such, in a case where the voltage VDC changes in response to an OFF control of the system main relays SMR-B, SMR-G (or at the same time as the change of the voltage VL), the control device 30 determines that the voltage sensor 14 is normal, but a welding defect occurs in both of the charging relays DCR-B, DCR-G.

Figure 6:
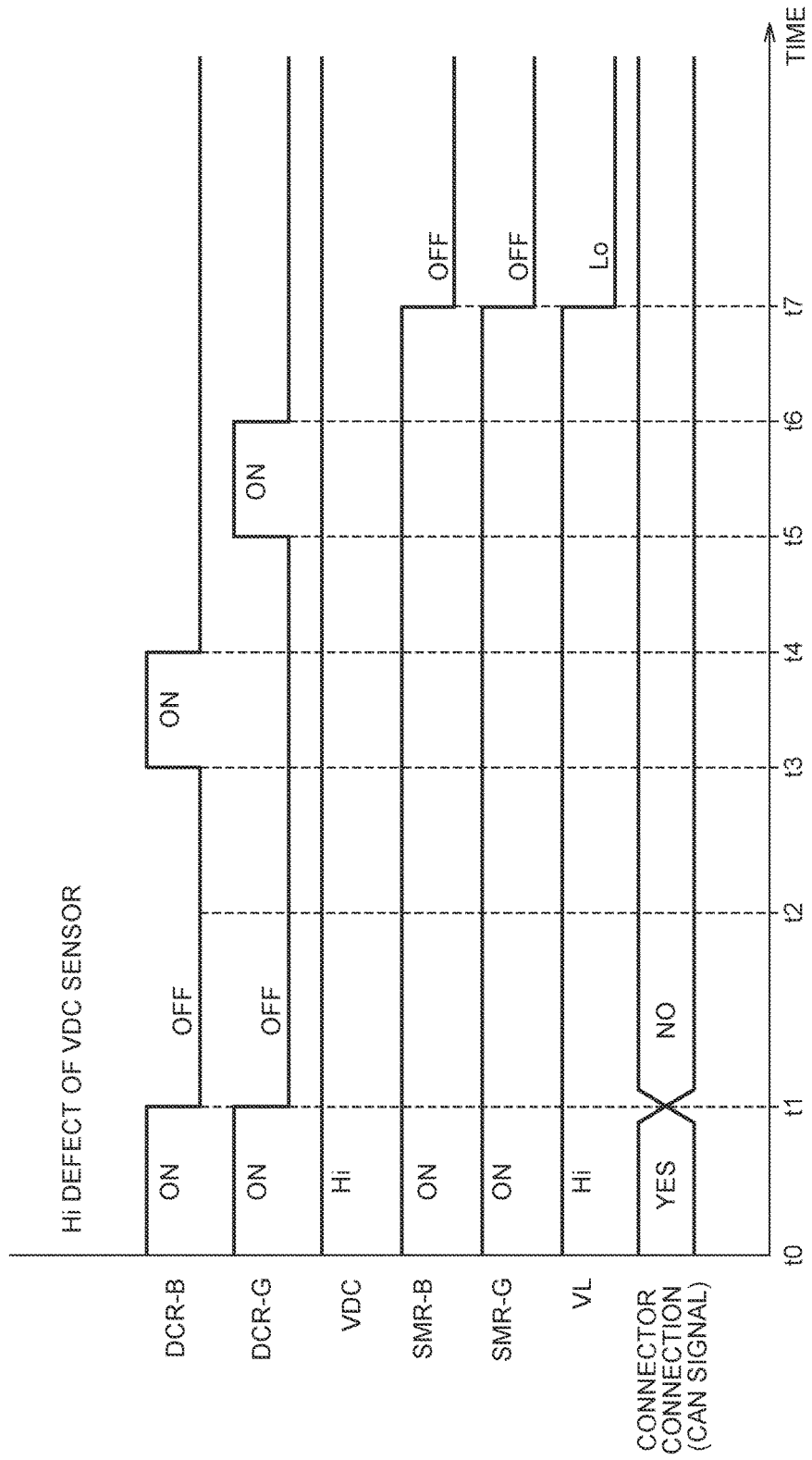
FIG. 6 is a waveform diagram to describe a state where the voltage sensor 14 is defective.

FIG. 6 is a waveform diagram to describe a state where the voltage sensor 14 is defective. In comparison with the waveform of FIG. 5, the same waveform is observed from the times t1 to t7 in the waveform diagram of FIG. 6.

In a case where such a waveform is observed, the control device 30 determines that a welding defect occurs in both of the charging relays DCR-B, DCR-G or the voltage sensor 14 is defective to fix an output to a Hi state, based on such a situation that the voltage VDC is in a Hi state from the times t1 to t3.

In view of this, the control device 30 controls both (or either one) of the system main relays SMR-B, SMR-G to an OFF state so that no voltage is applied to the charging relays DCR-B, DCR-G at the time t7. Consequently, in FIG. 6, the voltage VL detected by the voltage sensor 6 changes from a Hi state to a Lo state, and the voltage VDC detected by the voltage sensor 14 remains in a Hi state without any change. Thus, in a case where the voltage VDC remains in a Hi state without any change regardless of an OFF control of the system main relays SMR-B, SMR-G (or regardless of the change of the voltage VL to a Lo state), the control device 30 determines that the voltage sensor 14 is defective, and the charging relays DCR-B, DCR-G are not defective.

After the system main relays SMR-B, SMR-G and the charging relays DCR-B, DCR-G are turned on to charge the power storage device 2 from a power supply outside the vehicle, the control device 30 finishes the charging from the power supply outside the vehicle and performs an OFF control on the charging relays DCR-B, DCR-G. In this case, when the voltage sensor 14 detects a voltage not less than a determination value (that is, when the voltage VDC is in a Hi state), the control device 30 sets the voltage sensor 14 to a state where no voltage is applied thereto from the power storage device 2 as illustrated after the time t7 in FIGS. 5, 6, and executes a voltage sensor check to check whether or not the voltage sensor 14 detects the voltage not less than the determination value.

With such a control, it is possible to specify whether welding occurs in the charging relays DCR-B, DCR-G or a defect occurs in the voltage sensor 14.

In order to perform such a defect diagnosis process described in FIGS. 2 to 6, the control device 30 performs the following control. FIG. 7 is a flow chart to describe a charging-relay defect diagnosis process executed by the control device 30. When DC quick charge is started, the process of the flow chart is executed at the same time as the charging.

Referring now to FIGS. 1, 7, initially in step S1, the control device 30 determines whether or not the DC quick charge is finished. The DC quick charge is finished at the time when a state of charge SOC of the power storage device 2 reaches a predetermined value or at the time when a user instructs the DC quick charge stand 200 to finish the charging. The control device 30 executes a welding check on the DC charging relays DCR-B, DCR-G in step S2 before the user detaches the connector 210.

In the welding check of step S2, a check as indicated from the times t1 to t6 in FIGS. 2 to 6 is performed. Then, it is determined whether any abnormality occurs or not in step S3 based on a result of the welding check on the charging relays in step S2. In step S3, in a case where an abnormality occurs, the control device 30 advances the process to step S4, but if not, the control device 30 advances the process to step S8.

In step S4, the control device 30 determines whether or not there is a possibility that the DC charging relay DCR-B, DCR-G are both welded (welding of both electrode sides). A case where it is determined that there is possibility that both electrode sides are welded is a case where the voltage VDC is fixed to a Hi state from the times t1 to t6, as described in FIGS. 5, 6.

In step S4, in a case where there is a possibility that both electrode sides are welded, the control device 30 advances the process to step S5, but if not, the control device 30 advances the process to step S8.

In step S5, the control device 30 controls either one or both of the system main relays SMR-B, SMR-G to an OFF state so that no voltage is applied to the DC charging relays DCR-B, DCR-G from the power storage device 2. Then, in step S6, it is determined whether the connector 210 is connected to the inlet 16 or not (or whether a CAN signal is output or not).

In a case where the connector 210 is not connected to the inlet 16 (or no CAN signal is output), no voltage is applied to the voltage sensor 14 from the DC quick charge stand 200. In such a case (NO in step S6), the control device 30 advances the process to step S7, so as to check the voltage sensor 14 that detects the voltage VDC. More specifically, in a state illustrated at the time t7 in FIGS. 5, 6, the control device 30 checks whether the voltage VDC is in a Hi state or in a Lo state. If the voltage VDC is in a Hi state as described in FIG. 6, the voltage sensor 14 has a Hi-fixed defect, and if the voltage VDC is in a Lo state as described in FIG. 5, the DC charging relays DCR-B, DCR-G on both electrode sides have a welding defect. Thus, the defect is specified.

Then, in step S8, a check result is notified to the user. Note that, instead of immediately notifying the check result to the user, the check result may be stored in a nonvolatile memory. A content thus stored is read out in a case where the defect is specified later.

In a case of NO in step S3, the check result is "no abnormality." in a case of NO in step S4, the check result is "welding defect on either one electrode side," and in a case where the check of step S7 is performed, the check result is "welding defect on both electrode sides" or "defect of the voltage sensor 14."

After the check result is notified to the user in step S8, the process is advanced to step S9, and then, the process of the flow chart is finished.

As described above, after the system main relays SMR-B, SMR-G and the charging relays DCR-B, DCR-G are both turned on to charge the power storage device 2 from the power supply outside the vehicle, the control device 30 finishes the charging from the power supply outside the vehicle (YES in S1). At this time, in a case where an OFF control is performed on the charging relay DCR-B, DCR-G (S2) and the voltage sensor 14 detects a voltage not less than a determination value (YES in S3, S4), the control device 30 sets the voltage sensor 14 to a state where no voltage is applied thereto from the power storage device 2 (S5), and executes a voltage sensor check to check whether or not the voltage sensor 14 detects the voltage not less than the determination value (S7).

With such a control, it is possible to specify whether welding occurs in the charging relays DCR-B, DCR-G or a defect occurs in the voltage sensor 14.

Preferably, after the system main relays SMR-B, SMR-G and the charging relays DCR-B, DCR-G are turned on to charge the power storage device 2 from the power supply outside the vehicle, the control device 30 finishes the charging from the power supply outside the vehicle (YES in S1). At this time, in a case where an OFF control is performed on the charging relay DCR-B, DCR-G and the voltage not less than the determination value or more is not detected by the voltage sensor 14 (NO in S3), the control device 30 notifies a check result of the charging relays DCR-B, DCR-G (S8) without executing the voltage sensor check (S7).

When such a control, the check on the voltage sensor 14 is executed only when it is necessary. Accordingly, it is possible to reduce the number of times of the OFF control on the system main relays SMR-B, SMR-G, thereby making it possible to extend the life of a relay contact.

It should be considered that the embodiment described herein is just examples in all respects and are not limitative. A scope of the present specification is shown by Claims, not by the descriptions, and intended to include all modifications made within the meaning and scope equivalent to Claims.

What is claimed is:

1. A power supply system for a vehicle, comprising:
   a power storage device;
   a power line configured to supply an electric power to a vehicle electric load;
   a system main relay connected between the power storage device and the power line;
   a direct current inlet configured to receive, from a power supply outside the vehicle, a direct-current power with which the power storage device is charged;

a charging relay connected between the direct current inlet and the power line;

a voltage sensor configured to measure a voltage of a path from the direct current inlet to the charging relay; and an electronic control unit configured to control the system main relay and the charging relay, wherein the electronic control unit is configured such that, in a case where the electronic control unit turns on the system main relay and the charging relay to charge the power storage device from the power supply outside the vehicle, and after that, the electronic control unit finishes the charging from the power supply outside the vehicle and performs an OFF control on the charging relay, when the voltage sensor detects a voltage equal to or more than a determination value, the electronic control unit sets the voltage sensor to a state where no voltage is applied thereto from the power storage device, and executes a voltage sensor check to check whether or not the voltage sensor detects the voltage equal to or more than the determination value.

2. The power supply system for a vehicle, according to claim 1, wherein the electronic control unit is configured to perform the OFF control on the system main relay such that the voltage sensor is set to the state where no voltage is applied thereto from the power storage device, and then, to check whether or not the voltage sensor detects the voltage equal to or more than the determination value.

3. The power supply system for a vehicle, according to claim 1, wherein the electronic control unit is configured such that, in a case where the electronic control unit turns on the system main relay and the charging relay to charge the power storage device from the power supply outside the vehicle, and after that, the electronic control unit finishes the charging from the power supply outside the vehicle and performs an OFF control on the charging relay, if the voltage sensor does not detect the voltage equal to or more than the determination value, the electronic control unit notifies a check result of the charging relay without executing the voltage sensor check.

4. The power supply system for a vehicle, according to claim 1, wherein:

the charging relay includes a positive electrode side relay and a negative electrode side relay; and the electronic control unit is configured such that, in a case where both of the positive electrode side relay and the negative electrode side relay are controlled to an OFF state and the voltage sensor detects the voltage not less than the determination value, the electronic control unit executes a check on whether or not the voltage sensor is normal.

* * * * *

UNITED STATES PATENT AND TRADEMARK OFFICE
CERTIFICATE OF CORRECTION

PATENT NO. : 9,929,674 B2  
APPLICATION NO. : 15/071744  
DATED : March 27, 2018  
INVENTOR(S) : Koichi Kojima Page 1 of 1

It is certified that error appears in the above-identified patent and that said Letters Patent is hereby corrected as shown below:

In Column 1, Line 38, before "value", delete "abnoiinal" and insert --abnormal--, therefor.

Signed and Sealed this  
Eighth Day of May, 2018

Andrei Iancu  
*Director of the United States Patent and Trademark Office*